(12) United States Patent
Chien et al.

(10) Patent No.: US 12,252,433 B2
(45) Date of Patent: Mar. 18, 2025

(54) MELTING FURNACE ELECTRODE PUSH ASSEMBLY WITH TORQUE LIMITER

(71) Applicant: Corning Incorporated, Corning, NY (US)

(72) Inventors: Chih Hung Chien, Taichung (TW); Hyun-taek Han, Asan (KR); JinSoo Kim, Painted Post, NY (US); Yong-hyeon Park, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 600 days.

(21) Appl. No.: 17/637,535

(22) PCT Filed: Sep. 8, 2020

(86) PCT No.: PCT/US2020/049662
§ 371 (c)(1),
(2) Date: Feb. 23, 2022

(87) PCT Pub. No.: WO2021/050410
PCT Pub. Date: Mar. 18, 2021

(65) Prior Publication Data
US 2022/0289611 A1 Sep. 15, 2022

(30) Foreign Application Priority Data
Sep. 9, 2019 (KR) .................. 10-2019-0111659

(51) Int. Cl.
*C03B 5/027* (2006.01)
*F27D 11/10* (2006.01)

(52) U.S. Cl.
CPC ............ *C03B 5/0275* (2013.01); *F27D 11/10* (2013.01)

(58) Field of Classification Search
CPC .... H05B 3/03; H05B 3/06; C03B 5/02; C03B 5/027; C03B 5/0275; C03B 5/03;
(Continued)

(56) References Cited

U.S. PATENT DOCUMENTS 4,484,897 A 11/1984 Schudlich et al.
9,309,139 B2 * 4/2016 Bookbinder .......... C03B 5/1675
(Continued)

FOREIGN PATENT DOCUMENTS

CN 205635348 U 10/2016
CN 108061466 A * 5/2018
(Continued)

OTHER PUBLICATIONS

International Search Report and Written Opinion of the International Searching Authority; PCT/US2020/049662; Mailed Dec. 23, 2020; 10 Pages; Korean Intellectual Property Office.

*Primary Examiner* — Hung D Nguyen
(74) *Attorney, Agent, or Firm* — Matthew J. Mason (57) ABSTRACT

An assembly for pushing an electrode into a glass melting vessel can include a frame, a shaft, a pusher actuator, a contact mechanism, a master actuator, and a torque limiter. The contact mechanism can be attached to the shaft. The pusher actuator can be mounted to the frame and configured to cause translation of the shaft and the contact mechanism relative to the frame. The master actuator can be operatively connected to the pusher actuator such that operation of the master actuator causes operation of the pusher actuator. The torque limiter can be operatively connected between the master actuator and the pusher actuator, and can be configured to disengage when a rotational force on the master actuator exceeds a predetermined amount.

20 Claims, 7 Drawing Sheets

(58) Field of Classification Search
CPC .. C03B 5/235; F27B 3/085; F27B 3/19; F27B 3/20; F27D 11/04; F27D 11/08; F27D 11/10

See application file for complete search history.

(56) References Cited

U.S. PATENT DOCUMENTS

| | | | |
|---|---|---|---|
| 11,523,477 B2 * | 12/2022 | Cook | ............ F27D 99/0006 |
| 2021/0329752 A1 | 10/2021 | Cook et al. | |

FOREIGN PATENT DOCUMENTS

| | | | | | |
|---|---|---|---|---|---|
| EP | 0183613 | A1 | | 6/1986 | |
| EP | 2530057 | A2 | * | 12/2012 | ............ C03B 5/027 |
| JP | 2017178709 | A | * | 10/2017 | |
| KR | 20-0443466 | Y1 | | 2/2009 | |
| WO | 2014/050825 | A1 | | 4/2014 | |

\* cited by examiner

MELTING FURNACE ELECTRODE PUSH ASSEMBLY WITH TORQUE LIMITER

CROSS-REFERENCE TO RELATED APPLICATIONS

This application claims the benefit of priority under 35 U.S.C. § 371 of International Application No. PCT/US2020/049662, filed on Sep. 8, 2020, which claims the benefit of priority under 35 U.S.C. § 119 of Korean Application Serial No. 10-2019-0111659, filed Sep. 9, 2019, the content of each of which are incorporated herein by reference in their entirety.

FIELD

The present disclosure relates to apparatuses and methods for mechanically interfacing with an electrode as part of a system for melting batch materials, such as an electrode bank used in the melting of glass batch materials.

BACKGROUND

Melting furnaces can be used to melt a wide variety of batch materials, such as glass and metal batch materials, to name a few. Batch materials can be placed in a vessel having two or more electrodes and melted by applying voltage across the electrodes to drive current through the batch, thereby heating and melting the batch (or supplementing the heating energy generated by other sources (e.g., burning flame of fuel)). The life cycle of a melting furnace can depend on electrode wear. As a point of reference, the "hot face" or "front face" of the electrode is electrode end face that is nearest or in contact with batch materials within the melting furnace. The "cold face" or "rear face" is opposite the hot face, and is the electrode end face furthest from the molten batch materials. A length of the electrode is the distance between the hot and cold faces. During the melting process, the hot face of the electrode can be gradually worn down due to contact with the molten batch materials, decreasing the electrode length. At some point, the hot face may electrode may become too short and may compromise safe and/or efficient operation of the furnace.

With some melting furnace configurations, the electrode is periodically advanced into the vessel to re-position the worn hot face at a desired location relative to the vessel walls, the volume of batch materials, other electrodes, etc. For example, a length of the electrode is inserted through a passage or thru-hole in a side wall of the vessel, with the cold face located outside of the vessel wall. When desired, a pushing force is applied onto the cold face, causing the electrode to advance relative to the vessel chamber.

Where the electrode has a relatively small size and/or mass, it may not be necessary to support the electrode outside of the melting vessel wall, and the device or mechanism through which an operator applies a desired pushing force can be highly simplified. With some melting furnace configurations, however, an electrode bank is utilized, consisting of an array of electrodes. The electrode bank can have a relatively large size and mass. Moreover, to extend the useful life or campaign of the melting furnace, manufactures have endeavored to employ electrodes or electrode banks with increased lengths. As these electrodes or electrode banks become longer, there is a greater risk of misaligning the electrodes within the thru-hole. Applying a pushing force to a misaligned electrode risks damaging various components of the melting furnace, and the risk is magnified when the action is performed by less-experienced or less-skilled operators. Under these and other conditions, existing devices for facilitating application of a pushing force onto the electrode or the electrode bank may be insufficient.

Accordingly, apparatuses for interfacing with or handling an electrode or electrode bank at a location outside the melting vessel wall, for example facilitating application of a pushing force onto the electrode or electrode bank, are disclosed herein.

SUMMARY

Features disclosed herein enable periodic advancement of an electrode into a melting furnace by applying a pushing force to the cold face of the electrode. A push assembly can include a torque limiter to minimize the risk of equipment damage caused by electrode misalignment.

A push assembly can include a frame, a first shaft, a first pusher actuator, and a first contact mechanism. The first pusher actuator can be mounted to the frame and configured to translate the first shaft relative to the frame. The first contact mechanism can be attached to the first shaft and configured to translate relative to the frame. The push assembly can also include a master actuator and a torque limiter. The master actuator can be operatively connected to the first pusher actuator such that operation of the master actuator causes operation of the first pusher actuator. The torque limiter can be operatively connected between the master actuator and the first pusher actuator, and can be configured to disengage when a rotational force on the master actuator exceeds a predetermined amount.

In some embodiments, a push assembly can further include a second shaft, a second pusher actuator, and a second contact mechanism. The second pusher actuator can be mounted to the frame and configured to translate the second shaft relative to the frame. The second contact mechanism can be attached to the second shaft and configured to translate relative to the frame. The master actuator can be operatively connected to the second pusher actuator such that operation of the master actuator causes operation of the second pusher actuator. The torque limiter can be operatively connected between the master actuator and the second pusher actuator.

In various embodiments, a method of pushing an electrode into a glass melting vessel can include a step of positioning a push assembly proximate a rear face of an electrode. The push assembly can include a frame, a shaft, a pusher actuator, and a contact mechanism. The pusher actuator can be mounted to the frame and configured to translate the shaft relative to the frame. The contact mechanism can be attached to the shaft and configured to translate relative to the frame. The push assembly can also include a master actuator and a torque limiter. The master actuator can be operatively connected to the pusher actuator such that operation of the master actuator causes operation of the pusher actuator. The torque limiter can be operatively connected between the master actuator and the pusher actuator, and can be configured to disengage when a rotational force on the master actuator exceeds a predetermined amount. The master actuator can be operated to apply a pushing force with the contact mechanism to the rear face of the electrode.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

BRIEF DESCRIPTION OF DRAWINGS

The above summary and the below detailed description of illustrative embodiments may be read in conjunction with the appended Figures. The Figures show some of the illustrative embodiments discussed herein. The relative dimensions shown in the Figures can serve as original support for claimed features. As further explained below, the claims are not limited to the illustrative embodiments and are therefore not limited to any dimensions shown in the Figures unless otherwise explicit. For clarity and ease of reading, Figures may omit views of certain features.

DETAILED DESCRIPTION

While the features, methods, devices, and systems described herein may be embodied in various forms, there are shown in the drawings, and will hereinafter be described, some illustrative (i.e., example) embodiments. The claims are not limited to the illustrative embodiments and are intended to embrace their full-range of equivalents.

At times, the present application employs various directional terms (e.g., front, back, top, bottom, left, right, longitudinal, transverse, vertical, etc.) to give the reader context when viewing the Figures. The claims are not limited to the orientations shown in the Figures. Any absolute term (e.g., high, low, etc.) can be understood as disclosing a corresponding relative term (e.g., higher, lower, etc.). Referring to the Figures, depth along the X-axis can be "lateral", depth along the Y-axis can be "transverse", and depth along the Z-axis (normal to the X-Y plane) can be "vertical". In some embodiments, the X, Y, and Z-axes are consistent across the Figures.

The push assembly of the present disclosure is useful with a wide variety of different electrode configurations. By way of non-limiting example, a push assembly can as interface with a monolithic electrode bank that can include a plurality of electrodes assembled or arranged relative to one another in an array-like format. In other embodiments, a push assembly of the present disclosure can interface with a single electrode. With this in mind, unless otherwise specified, "electrode" and "electrode bank" can be used interchangeably.

As used herein, the term 'operatively connected' and 'operatively coupled' will be understood to mean one or more components, systems, device or mechanisms that are either directly connected/coupled or connected/coupled via a linking mechanism, e.g., linkage, one or more couplings, one or more drive shafts, one or more gears, etc., such that the respective components, systems, devices or mechanisms are interoperable with each other. That is, the respective components, systems, devices or mechanisms interact with each other or work together such that operation/function of one can cause and/or affect the operation/function of the other.

Figure 1:
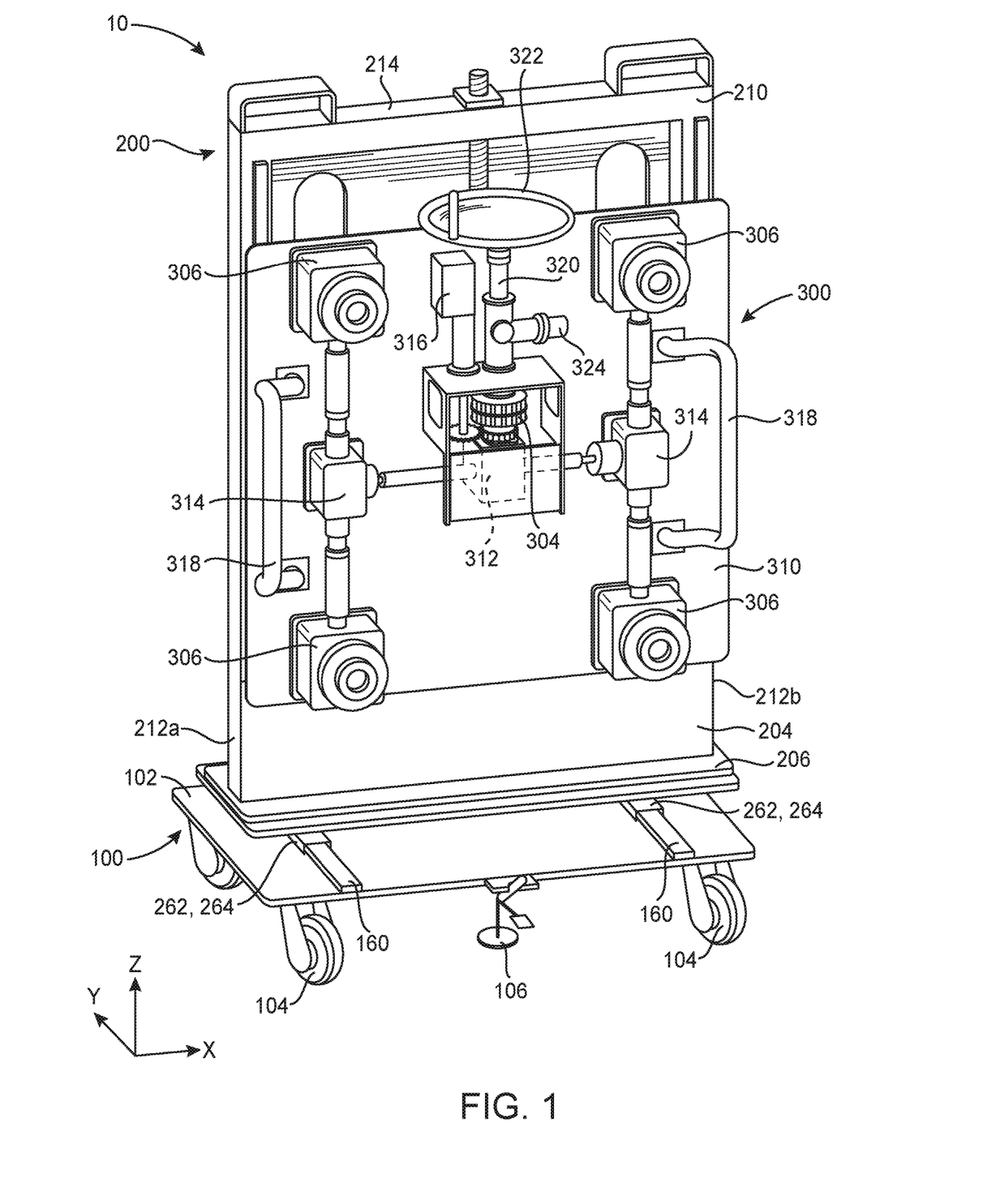
FIG. 1 is a rear isometric view of a simplified exemplary push assembly useful with an electrode interface.

Referring to FIG. 1, push assembly 10 can include a base assembly 100, a frame 200, and a body assembly 300. Base assembly 100 can include a base plate 102 to which one or more wheels 104 (also called casters) are mounted for moving push assembly 10 with respect to the ground (also called floor, not shown).

Base plate 102 can be a substantially planar body (i.e., within 10 percent of a truly planar body), formed of a material configured to maintain its structural integrity under expected forces (such as when applying a pushing force onto an electrode bank). For example, base plate 102 can be stainless steel, although other materials are also envisioned. Base plate 102 can have various shapes and sizes, and in some embodiments is sized in accordance with other features of push assembly 10 as described in greater detail below. Wheels 104 can be configured to allow push assembly 10 to perform a zero radius 360° turn. Base assembly 100 can also include one or more floor locks 106 for securing and preventing movement of push assembly 10 relative to the ground. In another embodiment (not shown) floor locks 106 can include caster locks mounted directly to wheels 104.

Base assembly 100 can also include one or more transverse guide rails 160 mounted to base plate 102. As a result, base assembly 100 can be configured to allow frame 200 to articulate transversely forward or backward (respectively meaning the +Y and −Y directions) relative to base assembly 100. Transverse guide rails 160 can be mounted to base plate 102 by metal welding, or by screws, bolts, rivets, and the like.

Frame 200 can include at least one structural framework 210 for mounting body assembly 300 to frame 200. Framework 210 can include lateral side members 212a, 212b, and an upper member 214. Frame 200 can also include a front plate 202, a lower plate 204, a frame platform 206, and one or more cross-bars 208 (shown in FIG. 3). Framework 210 can be formed of a rigid material selected to maintain its structural integrity under expected forces (e.g., stainless steel), as can the joints or connections (e.g., metal welding, or screws, bolts, rivets, and the like) formed between framework 210 and other frame components, such as front plate 202, lower plate 204, Frame platform 206, or cross-bar 208. The dimensions of frame 200 can be selected as a function of expected parameters of an end use application. For example the lateral spacing between the lateral side members 212a, 212b of framework 210 can be selected to be greater than an expected width of the electrode bank with which the push assembly 10 will be employed.

Framework 210 can be directly secured (e.g., welded, fastened, etc.) to frame platform 206. Frame platform 206 can be configured for mounting frame 200 to base assembly 100. Frame platform 206 can include one or more transverse movement mechanisms 262. Transverse movement mechanisms 262 can assume various forms conducive to selective transverse adjustment or movement of the frame 200 relative to base assembly 100, and in some embodiments can include transverse locking devices 264 (referenced generally). Transverse movement mechanisms 262 are disposed so as to be in contact with transverse guide rails 160, and are configured to roll, slide or otherwise move along the transverse guide rails 160.

The transverse locking devices 264 can assume various forms appropriate for locking the frame 200 relative to base assembly 100 at a desired transverse position or location. In some embodiments, the transverse locking devices 264 can be bolts threadably secured to a respective one of the transverse movement mechanisms 262. Once frame 200 is at a desired transverse position, the bolts can be rotated or otherwise advanced into contact with transverse guide rails 160, thereby preventing further transverse movement. Loosening of the bolts permits movement of transverse movement mechanisms 262, and thus movement of frame 200, relative to base assembly 100 in a direction of the Y-axis. Other locking device constructions that may or may not include threaded bolts are also acceptable Still referring to FIG. 1, body assembly 300 can include a body plate 310 (also called a rear plate), and one or more operatively connected components adapted for applying a pushing force to the rear face of an electrode. For example, a body assembly 300 can include a master actuator 320, a torque limiter 304 (also called an overload clutch), one or more pusher actuators 306, one or more shafts 308 (shown in FIG. 2), and one or more contact mechanisms 330 (shown in FIG. 2). Body assembly 300 can also include a primary gearbox 312, and one or more secondary gearboxes 314. Body plate 310 can be a substantially planar body (i.e., within 10 percent of a truly planar body), formed of a material configured to maintain its structural integrity under expected forces (such as when applying a pushing force onto an electrode bank). For example, body plate 310 can be stainless steel, although other materials are also envisioned. Body plate 310 can have various shapes and sizes, and in some embodiments is sized in accordance with other features of push assembly 10 as described in greater detail herein.

A master actuator 320 can be configured to rotate relative to push assembly 10. As the Figures illustrate, the master actuator 320 of the present embodiment can be configured to rotate about the vertical axis (i.e. the Z-axis). However, a master actuator 320 which rotates about the lateral axis (i.e. the X-axis) or the transverse axis (i.e. the Y-axis) is also acceptable. Master actuator 320 can assume different forms conducive to user application of a rotational force (i.e. torque), and in some embodiments can include a hand wheel 322 or alternatively a crank handle. Master actuator 320 can also be configured to receive rotational force from a power operated motor (i.e. electric, pneumatic, etc.) operatively connected to power input 324. Optionally, hand wheel 322 can include a clutch for selectively coupling hand wheel 322 to master actuator 320, and for disengaging hand wheel 322 from master actuator 320 during use of a power operated motor.

Master actuator 320 can be operatively connected to a torque limiter 304, which can be operatively connected to a primary gearbox 312. Torque limiter 304 can assume different forms capable of transmitting torque directly or indirectly from master actuator 320 to primary gearbox 312, while also being configured to disengage a torque transfer connection when the torque exceeds a predetermined value, thereby allowing master actuator 320 to actuate independently from primary gearbox 312. In some embodiments, torque limiter 304 can be a slip type torque limiter, or alternatively a disconnect type torque limiter. In the event that torque applied by master actuator 320 rises beyond a specific level, torque limiter 304 can release excess torque by disengaging the operative connection between master actuator 320 and primary gearbox 312, thereby limiting the torque to the predetermined value. In some embodiments, the predetermined value can be less than 1.4 kgf·m, between 1.4 kgf·m and 5.5 kgf·m, between 2.3 kgf·m and 3.3 kgf·m, or greater than 5.5 kgf·m.

Torque limiter 304 can be operatively connected to primary gearbox 312, which can be operatively connected to one or more secondary gearboxes 314. Primary gearbox 312 can assume different forms capable of transmitting torque directly or indirectly from Torque limiter 304 to one or more secondary gearboxes 314. In some embodiments, primary gearbox 312 can be configured to output torque about an axis of rotation that is different from the axis of rotation of the input to primary gearbox 312, such as a perpendicular (i.e. 90°) axis of rotation. In FIG. 1, for example, the torque inputted from Torque limiter 304 to primary gearbox 312 is applied about the Z-axis, while the torque outputted from primary gearbox 312 to secondary gearboxes 314 is applied about the X-axis. By way of non-limiting example, primary gearbox 312 can be a bevel gearbox, a worm gearbox, or a hypoid gearbox.

Primary gearbox 312 can be configured to transmit torque in more than one direction, and in some embodiments can be a three-way gearbox. For example, in FIG. 1, primary gearbox 312 is configured to transmit torque to each of the secondary gearboxes 314 which are mounted on opposite sides of body plate 310. Primary gearbox 312 can also be configured with a gear ratio (also called a speed ratio) greater than 1:1.

Primary gearbox 312 can be operatively connected to secondary gearbox 314, which can be operatively connected to one or more pusher actuators 306. Secondary gearbox 314 can assume different forms capable of transmitting torque directly or indirectly from primary gearbox 312 to one or more pusher actuators 306. In some embodiments, secondary gearbox 314 can be configured to output torque about an axis of rotation that is different from the axis of rotation of the input to secondary gearbox 314, such as a perpendicular (i.e. 90°) axis of rotation. In FIG. 1, for example, the torque inputted from primary gearbox 312 to secondary gearbox 314 is applied about the X-axis, while the torque outputted from secondary gearbox 314 to pusher actuators 306 is applied about the Z-axis. By way of non-limiting example, secondary gearbox 314 can be a bevel gearbox, a worm gearbox, or a hypoid gearbox.

Secondary gearbox 314 can be configured to transmit torque in more than one direction, and in some embodiments can be a three-way gearbox. For example, in FIG. 1, secondary gearbox 314 is configured to transmit torque to two of pusher actuators 306 which are mounted on opposite sides of body plate 310. Secondary gearbox 314 can also be configured with a gear ratio greater than 1:1.

While body assembly 300 is shown as including two secondary gearboxes 314, any other number, either greater or lesser, is also acceptable. For example, the number of secondary gearboxes 314 can vary depending on the gear ratio needs of push assembly 10, the number of pusher actuators 306, or the spatial arrangement of pusher actuators 306 mounted on body plate 310.

Each pusher actuator 306 can be directly secured (e.g., welded, fastened, etc.) to body plate 310 and can be threadably coupled to shaft 308. In some embodiments, pusher actuator 306 can be a linear actuator, such as a ball screw actuator or a lead screw actuator (also called screw jacks). While body assembly 300 is shown as including four pusher actuators 306, any other number, either greater or lesser, is also acceptable in accordance with the number of contact mechanisms 330 as described below.

Body assembly 300 can also include a counting device 316 operatively connected to master actuator 320. Counting device 316 can be configured to calculate the number of rotations completed by master actuator 320 during operation of push assembly 10. Body assembly 300 can also include one or more handles 318 mounted to body plate 310. In alternative embodiments, handles 318 can be mounted to lateral side members 212a, 212b of framework 210.

Figure 2:
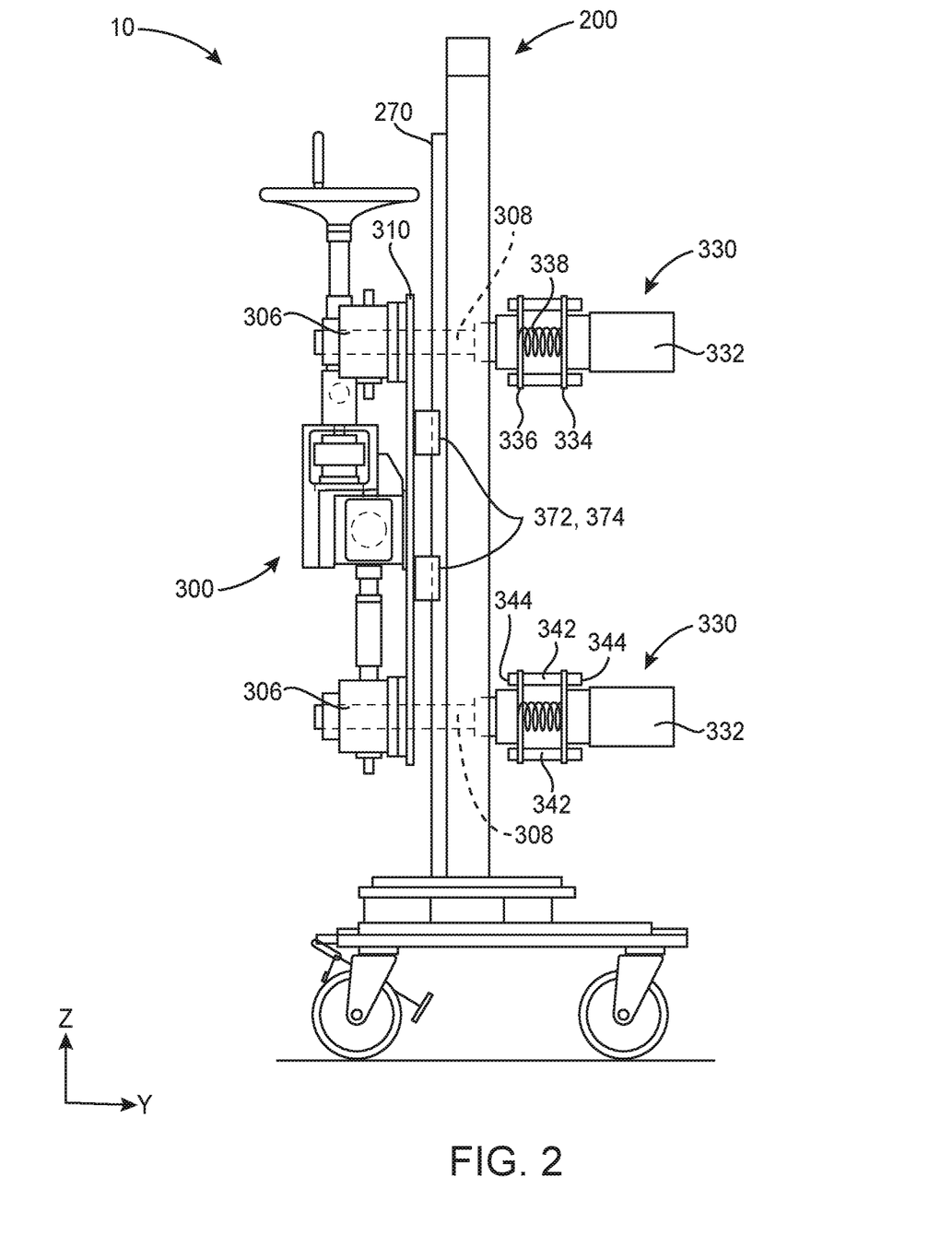
FIG. 2 is a side elevational view of the simplified exemplary push assembly of FIG. 1.

Referring to FIG. 2, body plate 310 can include one or more apertures (not shown) through which a shaft 308 can extend in the Y-axis direction. Shaft 308 can be formed of a material configured to maintain its structural integrity under expected forces. For example, body plate 310 can be stainless steel, although other materials are also envisioned. Shaft 308 can have various dimensions selected as a function of expected parameters of an end use application. For example, the length of shaft 308 can be selected to allow contact mechanism 330 to physically interface with the electrode bank with which the push assembly 10 will be employed. In some embodiments, the length of shaft 308 can be approximately 6 inches. In other embodiments, the length of shaft 308 can be 24 inches or more. Shaft 308 can assume different forms capable of extension in the Y-axis direction, in some embodiments shaft 308 can be a lead screw or similar device having an exteriorly threaded surface.

Body assembly 300 can carry one or more components adapted to establish a connection with the rear face of an electrode of an electrode bank. For example, each shaft 308 can carry a contact mechanism 330 attached to the distal end of shaft 308 (i.e. opposite pusher actuator 306). Contact mechanism 330 can terminate at a contact head 332. Contact head 332 can be have a variety of different constructions (e.g., materials, shapes, sizes, etc.). In some embodiments, contact head 332 can be constructed of a material with high resistance to both heat and electric current (e.g., rubber).

Contact mechanism 330 can assume various forms appropriate for physically interfacing with an electrode or electrode bank, and in some embodiments can include a contact head 332, a distal flange 334, a proximal flange 336, a coil spring 338, two or more stud bolts 342 (or alternatively an all thread rod), and threaded nuts 344. Contact head 332 can be directly secured (e.g. welded, fastened, etc.) to distal flange 334. Distal flange 334 can be secured to proximal flange 336 by a series of stud bolts 342 fastened with at least one threaded nut 344 on the end of each bolt, clamping the distal and proximal flanges 334, 336 together (hereinafter referred to as a "stud bolt configuration"). Distal flange 336 can be directly secured (e.g. welded, fastened, etc.) to shaft 308. In some embodiments, an annular spacer (not labelled) can be disposed about each stud bolt between distal and proximal flanges 334, 336, thereby spatially separating distal and proximal flanges 334, 336 as shown in the Figures.

In some embodiments, stud bolts 342 can be electrically isolated from the distal and proximal flanges 334, 336 by electrical-insulating sleeves and electrical-insulating washers separating the threaded nuts 344 from the distal and proximal flanges. While the Figures illustrate each contact mechanism 330 as including four stud bolts 342, any other number, either greater or lesser, is also acceptable.

In some embodiments, the stud bolt configurations above which spatially separate distal and proximal flanges 334, 336 further provide a user the ability to selectively alter a spacing between the rear face of the electrode and the contact mechanism 330 (and thus adjust or "fine tune" an applied force, or to equalize the applied force across multiple contact mechanisms 330). Each contact mechanism 330 can also include a coil spring 338 configured to apply a separating force to distal and proximal flanges 334, 336, which further facilitates user adjustment of the spacing between distal and proximal flanges 334, 336. Other contact mechanism constructions are also acceptable, and may or may not include a stud bolt configuration. In yet other embodiments, contact head 332 can be adapted to directly mount to shaft 308.

During use of push assembly 10, pusher actuator 306 can operate with user-caused rotation of the master actuator 320, causing transverse extension of shaft 308 due to the threaded coupling of shaft 308 with the pusher actuator 306. Accordingly, operation of master actuator 320 can cause contact mechanism 330 to move toward or away from the body plate 310 and frame 200 (i.e., in a direction of the Y axis), thereby releasing or applying a pushing force to the rear face of an electrode. In some embodiments, pusher actuator 306 can be a non-rotating linear actuator, such that shaft 308 and contact mechanism 330 do not rotate relative to push assembly 10 (i.e. about at least the Y-axis) during use. In other embodiments, pusher actuator 306 can be configured to allow shaft 308 and contact mechanism 330 to rotate relative to push assembly 10 during use.

Figure 3:
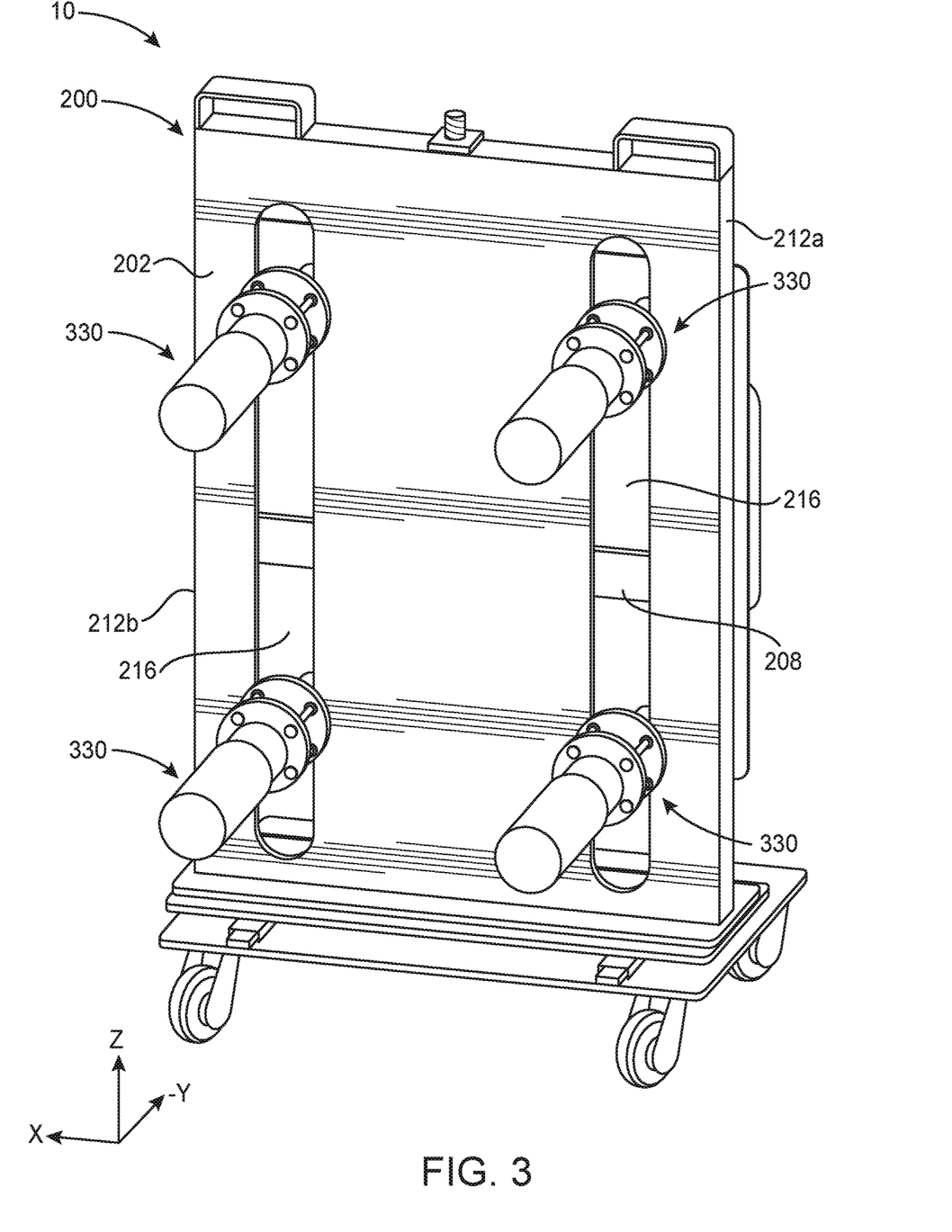
FIG. 3 is a front isometric view of the simplified exemplary push assembly of FIG. 1.

Referring to FIG. 3, frame 200 can include front plate 202 connected to framework 210. Front plate 202 can be configured with one or more appropriately sized apertures 216 through which shafts 308 are extended. Frame 200 can also include one or more cross-bars 208. Cross-bar 208 can extend between and interconnect the lateral side members 212a, 212b of framework 210 and assist in maintaining the lateral side members 212a, 212b at a selected lateral spacing (i.e., dimension in a direction of the X axis). While FIG. 3 illustrates the frame 200 as including one cross-bar 208, any other number, either greater or lesser, is also acceptable.

In general, contact mechanisms 330 can be configured to establish a footprint appropriate for interfacing with the rear face of an electrode bank. The number and configuration of contact mechanisms 330 can be selected as a function of expected parameters of an end use application, for example the size and configuration of the electrode or electrode bank with which the push assembly 10 will be employed. While FIG. 3 illustrates the push assembly 10 as including four contact mechanisms 330, any other number, either greater or lesser, is also acceptable.

Figure 4:
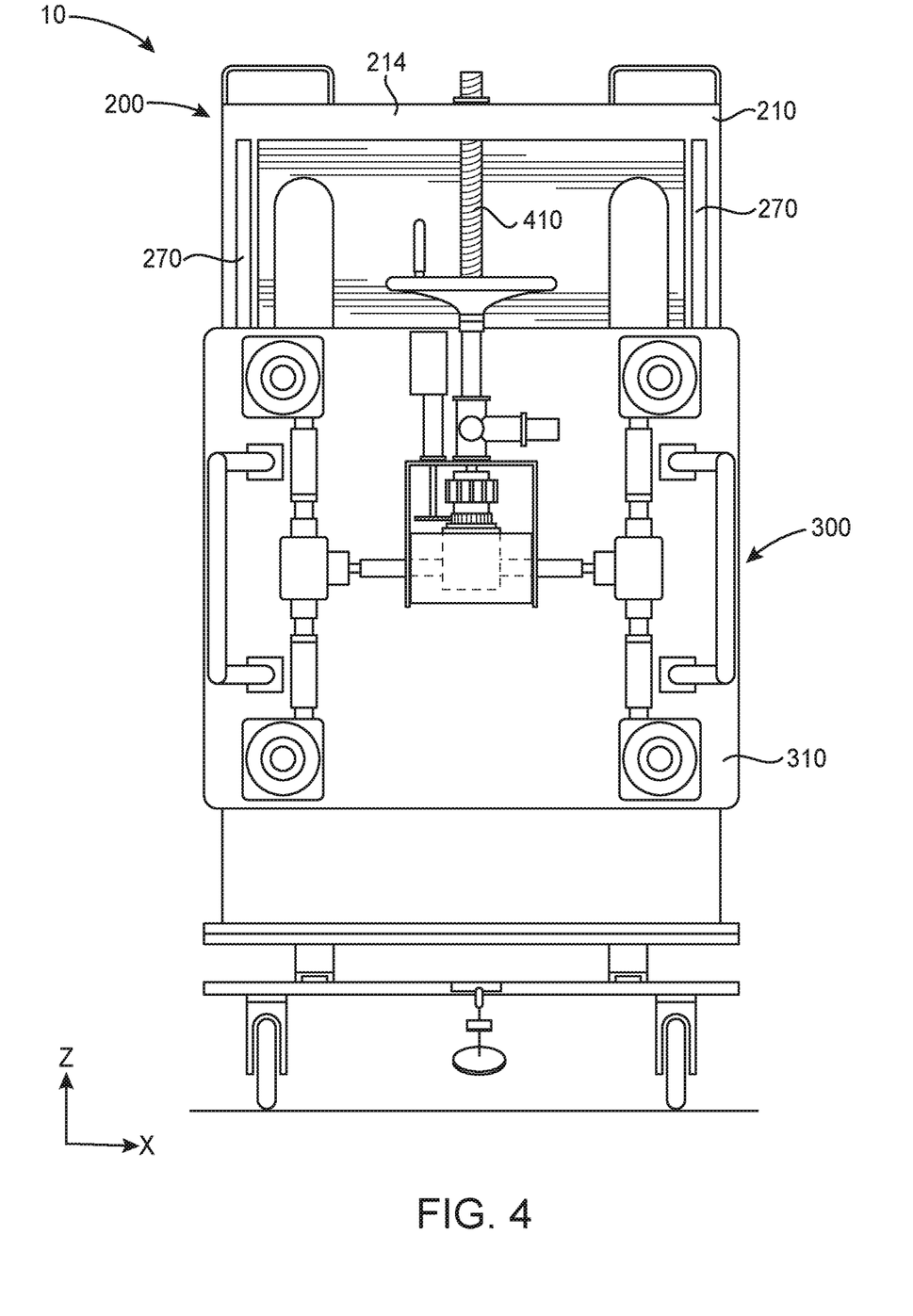
FIG. 4 is a rear elevational view of the simplified exemplary push assembly of FIG. 1 where the adjustable height is in a lowered state.

Referring to FIG. 4, frame 200 can also include one or more vertical guide rails 270 mounted to framework 210. As a result, frame 200 can be configured to allow body assembly 300 to articulate vertically up or down (respectively meaning the +Z and −Z directions) relative to frame 200. Vertical guide rails 270 can be mounted to framework 210 by metal welding, or by screws, bolts, rivets, and the like. As shown in FIG. 4, push assembly 10 can be configured such that body assembly 300 is in a lowered state relative to frame 200.

In some embodiments, framework 210 can be configured to movably receive vertical track 410, for example via an appropriately sized bore in the upper member 214 of framework 210. Body assembly 300 can be configured to carry one or more components on the frontal face (not shown in FIG. 4) of body plate 310 that promote a translatable connection between the body assembly and vertical track 410 by which the body assembly 300 can selectively move along vertical track 410. For example, a threaded bushing can be mounted on the frontal face of body plate 310 that threadably interfaces with vertical track 410. Other coupling formats are also acceptable.

Figure 5:
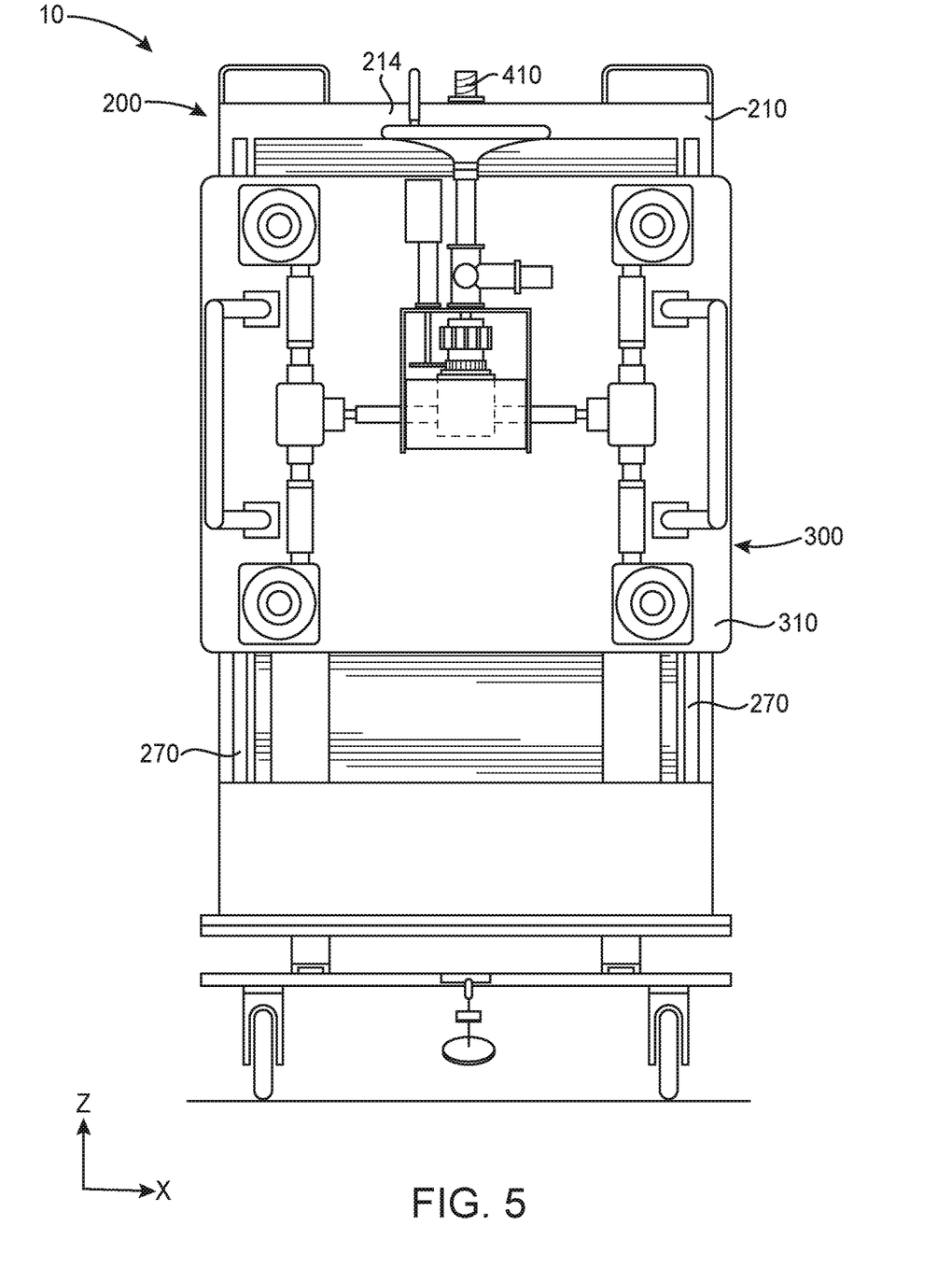
FIG. 5 is a rear elevational view of the simplified exemplary push assembly of FIG. 1 where the adjustable height is in a raised state.

Vertical track 410 can assume various forms conducive to an articulating interface with body assembly 300, and in some embodiments can be a lead screw or similar device having an exteriorly threaded surface. With these and similar embodiments, a threaded interface can be established between vertical track 410 and body assembly 300 (e.g., via the optional threaded bushing provided with body assembly 300 as described above). Vertical track 410 can be sized to extend between the upper member 214 and cross-bar 208 (shown in FIG. 3) of frame 200. With optional embodiments in which vertical track 410 is a lead screw or similar device having an exteriorly threaded surface, vertical track 410 can be coupled to upper member 214 and cross-bar 208 in a manner permitting rotation of vertical track 410 relative to upper member 214 and cross-bar 208 without axial movement (i.e., vertical track 410 can be rotated relative to upper member 214 and cross-bar 208 but will not spatially move in at least a direction of the Z-axis). In such embodiments, a user can rotate vertical track 410 in a desired direction, for example via manually applied rotational force. Rotation of vertical track 410 can cause the body assembly 300 to articulate in the vertical direction, the end result being the raised state of body assembly 300 as shown in FIG. 5.

While body assembly 300 and vertical track 410 have been described as incorporating a threaded interface that facilitates vertical translation or articulation (i.e., in a direction of the Z-axis) of the body assembly 300 along vertical track 410, other formats are also acceptable. For example, vertical track 410 can form or define a series of teeth, with body assembly 300 configured to be vertically raised or lowered along vertical track 410 to a selected incremental position between adjacent ones of the teeth.

As seen in FIG. 2, body plate 310 can include one or more vertical movement mechanisms 372 configured for mounting body assembly 300 to frame 200. Vertical movement mechanisms 372 can assume various forms conducive to selective vertical adjustment or movement of the body assembly 300 relative to the frame 200, and in some embodiments can include vertical locking devices 374 (referenced generally). Vertical movement mechanisms 372 are disposed so as to be in contact with vertical guide rails 270, and are configured to roll, slide or otherwise move along the vertical guide rails 270.

The vertical locking devices 374 can assume various forms appropriate for locking the body assembly 300 relative to the frame 200 at a desired vertical position or location. In some embodiments, the vertical locking devices 374 can be bolts threadably secured to a respective one of the vertical movement mechanisms 372. Once body assembly 300 is at a desired vertical position, the bolts can be rotated or otherwise advanced into contact with vertical guide rails 270, thereby preventing further vertical movement. Loosening of the bolts permits movement of vertical movement mechanisms 372, and thus of body assembly 300, relative to the frame 200 in a direction of the Z-axis. Other locking device constructions that may or may not include threaded bolts are also acceptable.

As seen in FIG. 3, front plate 202 of frame 200 can be configured such that the one or more apertures 216 are sized in a manner that accommodates all vertical positions or orientations of body assembly 300 relative to frame 200.

Figure 6:
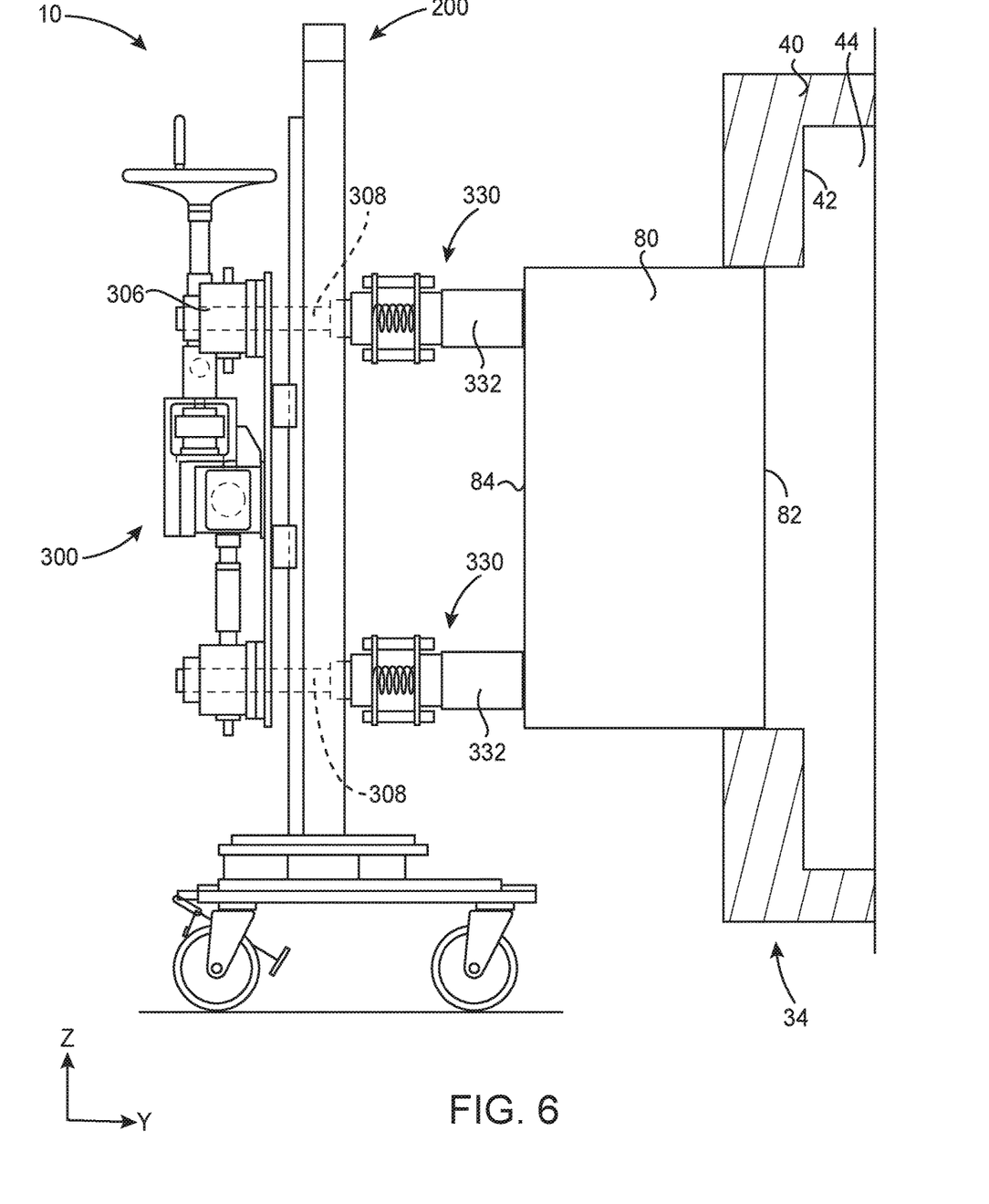
FIG. 6 is a side elevational view of the simplified exemplary push assembly of FIG. 1 following wearing of the electrode or electrode bank.

Referring to FIG. 6, embodiments of the present disclosure can be employed for use with a melting furnace system for melting batch materials. The melting furnace can include a vessel 34 and at least one electrode or electrode bank 80. In general terms, vessel 34 can assume various forms, and generally includes or defines side walls 40 and a floor or bottom (not labelled) that combine to define a chamber 44. Vessel 34 can have any suitable shape or size for the desired application and can, in certain embodiments, have, for example, a circular, oval, square or polygonal cross-section. The dimensions of vessel 34, including the length, height, width, and depth, to name a few, can vary depending upon a particular process or system.

One or more of electrodes 80 can be assembled within and extend through a side wall 40 of vessel 34 to a position approximately flush with an inner surface 42 of side wall 40 (and thus exposed to chamber 44 and the materials contained within). Electrode 80 can be viewed or considered as defining a front face (or "hot face") 82 opposite a rear face (or "cold face") 84. Front face 82 is the electrode end face open to the chamber 44 (e.g., the front face 82 is located within the chamber 44, or is within a thickness of the side wall 40). Rear face 84 is the electrode end face farthest away from the vessel 40, and is not within or open to chamber 44.

In some embodiments, assembly of electrodes 80 to vessel 34 (e.g., to side wall 40) is such that electrode 80 can be advanced relative to side wall 40, and thus relative to chamber 44. For example, mounting of electrode 80 to side wall 40 is such that electrode 80 can be slid or pushed relative to side wall 40, re-positioning front face 82 relative to chamber 44. During operation, electrode 80 will experience wear over time, primarily at front face 82. In other words, front face 82 will physically erode toward rear face 84. When electrode 80 is stationary or fixed relative to side wall 40, a physical location of front face 82 relative to side wall 40 will thus change as electrode 80 experiences wear. Under these circumstances and with embodiments in which electrode 80 is slidably mounted to side wall 40, electrode 80 can be periodically advanced, via push assembly 10, toward chamber 44 (i.e., moved in the rightward direction in FIG. 6) to reposition the now-worn front face 82 at a desired location relative to inner surface 42.

Electrode 80 can have any dimension and/or shape suitable for operation in a melting furnace. For instance, in some embodiments, the electrode 80 can be shaped as a rod or block. Electrode 80 can have any suitable cross-sectional shape, such as square, circular, or any other regular or irregular shape. Moreover, the initial length of electrode 80 can vary depending on the application and/or size of vessel 34. In some non-limiting examples, electrode 80 can have an initial length on the order of 36 inches, and weight (or mass) on the order of at least 3000 pounds. Push assembly 10 of the present disclosure is configured to robustly interface with electrodes or electrode banks at least 36 inches in length and weighing at least 3000 pounds, and are equally appropriate for interfacing with smaller and/or lighter electrode configurations.

Over time during a melting operation, front face 82 of electrode 80 can erode or wear as reflected by FIG. 6 (whereas front face 82 may have otherwise been flush with inner surface 42 at an earlier point in time during the course of a melting operation). Under these and other circumstances, push assembly 10 can be user-operated to advance electrode 80 relative to side wall 40 (i.e., in a direction of the Y axis) to relocate the now-worn front face 82 at a desired position. Operation of master actuator 320 ultimately causes contact mechanisms 330 to articulate in the transverse direction (i.e., a direction of the Y axis) and apply a pushing force onto rear face 84, for example via the contact heads 332.

Figure 7:
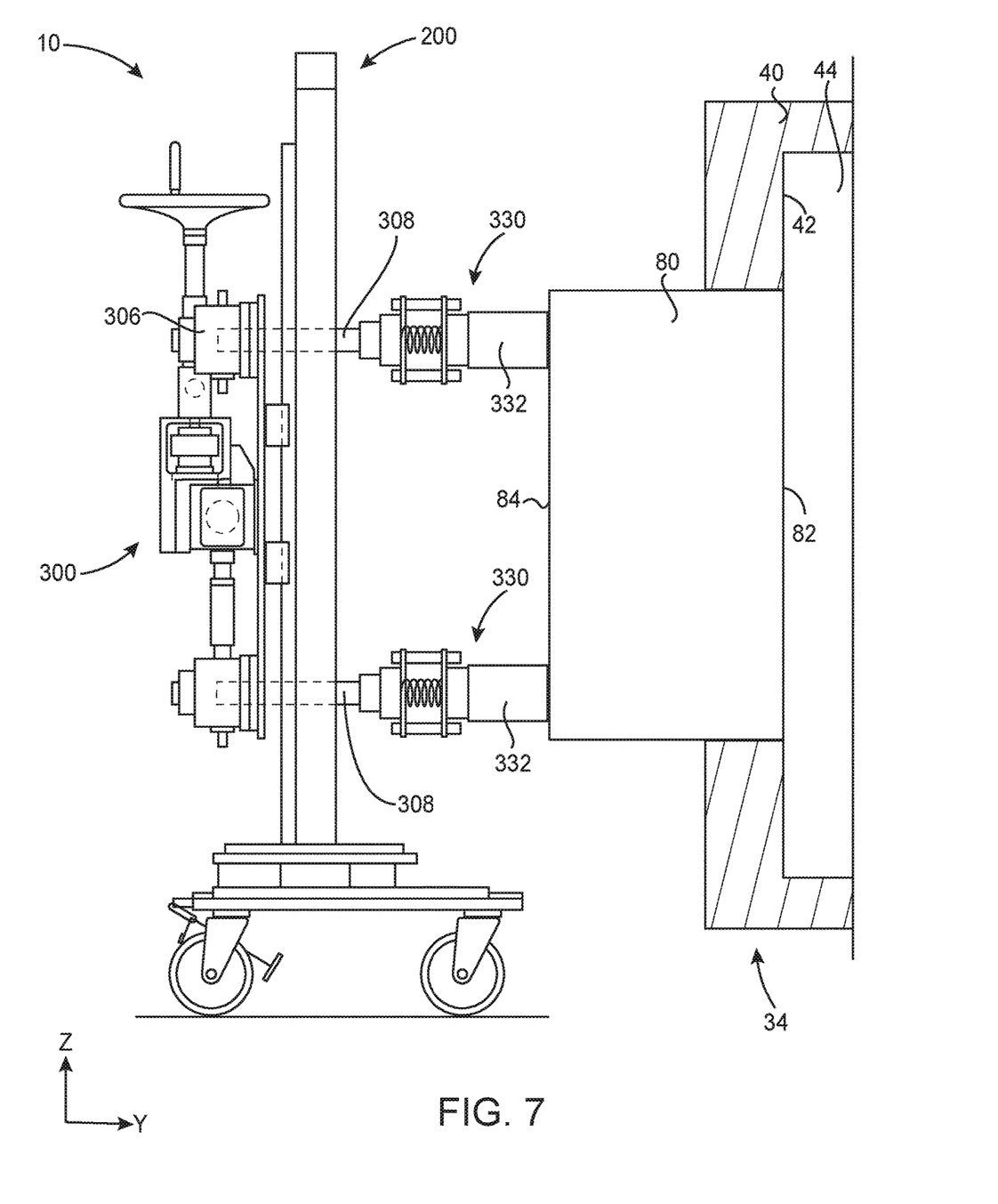
FIG. 7 is a side elevational view of the arrangement of FIG. 6 following operation of the push assembly to advance the electrode or electrode bank.

FIG. 7 reflects the arrangement of FIG. 6 following application of the pushing force onto electrode 80. As revealed by a comparison of the views, contact mechanisms 330 have advanced transversely relative to frame 200 (i.e., in the direction of the Y-axis), applying a pushing force onto rear face 84 that in turn has caused electrode 80 to advance relative to side wall 40. Front face 82 has been relocated to a desired position relative to side wall 40. In some embodiments, an operator can optionally actuate one or more of contact mechanisms 330 (e.g., where the contact mechanisms 330 include a stud bolt configuration or similar construction) on an individual basis to slightly adjust or "fine tune" the position of the corresponding contact head 332, and thus the force applied onto rear face 84 by contact mechanism 330.

We claim:

1. An assembly for pushing an electrode into a glass melting vessel, comprising:
   a frame;
   a first shaft;
   a first pusher actuator mounted to the frame and configured to translate the first shaft relative to the frame;
   a first contact mechanism attached to the first shaft and configured to translate relative to the frame;
   a master actuator operatively connected to the first pusher actuator such that operation of the master actuator causes operation of the first pusher actuator; and
   a torque limiter operatively connected between the master actuator and the first pusher actuator, the torque limiter configured to disengage when a rotational force on the master actuator exceeds a predetermined amount.

2. The assembly of claim 1, wherein:
   the frame comprises a rear plate located opposite the vessel; and
   the first pusher actuator is mounted to the rear plate.

3. The assembly of claim 1, wherein the first shaft comprises a threaded screw and the first pusher actuator comprises a screw jack.

4. The assembly of claim 1, wherein the master actuator is manually operated.

5. The assembly of claim 1, wherein the master actuator is power operated.

6. The assembly of claim 1, wherein the master actuator is configured to be both manually operated and power operated.

7. The assembly of claim 1, wherein the first contact mechanism comprises one or more flanges.

8. The assembly of claim 1, wherein the torque limiter comprises a friction torque limiter.

9. The assembly of claim 1, wherein the first pusher actuator is configured such that the first shaft and the first contact mechanism translate, but do not rotate relative to the frame.

10. The assembly of claim 1, further comprising at least one gearbox operatively connected between the master actuator and the first pusher actuator.

11. The assembly of claim 10, wherein the at least one gearbox is configured to increase the rotational force transmitted from the master actuator to the first pusher actuator.

12. The assembly of claim 1, further comprising a safety covering around the torque limiter.

13. The assembly of claim 1, further comprising:
    a second shaft;
    a second pusher actuator mounted to the frame and configured to translate the second shaft relative to the frame; and
    a second contact mechanism attached to the second shaft and configured to translate relative to the frame;
    wherein the master actuator is operatively connected to the second pusher actuator such that operation of the master actuator causes operation of the second pusher actuator; and
    wherein the torque limiter is operatively connected between the master actuator and the second pusher actuator.

14. The assembly of claim 13, further comprising at least one gearbox, the at least one gearbox being configured to operatively connect the first and second pusher actuators in parallel with the master actuator.

15. The assembly of claim 14, wherein the torque limiter is operatively connected between the at least one gearbox and the master actuator.

16. A method of pushing an electrode into a glass melting vessel, the method comprising:
    positioning a push assembly proximate a rear face of an electrode, the push assembly comprising:
      a frame;
      a shaft;
      a pusher actuator mounted to the frame and configured to translate the shaft relative to the frame;
      a contact mechanism attached to the shaft and configured to translate relative to the frame;
      a master actuator operatively connected to the pusher actuator such that operation of the master actuator causes operation of the pusher actuator; and
      a torque limiter operatively connected between the master actuator and the pusher actuator, the torque limiter configured to disengage when a rotational force on the master actuator exceeds a predetermined amount; and
    operating the master actuator to apply a pushing force with the contact mechanism to the rear face of the electrode.

17. The method of claim 16, wherein the operating of the master actuator includes:
    applying the rotational force to the master actuator; and
    disengaging the master actuator from the pusher actuator by disengaging the torque limiter when the rotational force exceeds the predetermined amount.

18. The method of claim 16, wherein the shaft comprises a threaded screw and the pusher actuator comprises a screw jack.

19. The method of claim 16, wherein the master actuator is configured to be both manually operated and power operated.

20. The method of claim 16, wherein the push assembly further comprises at least one gearbox operatively connected between the master actuator and the pusher actuator.

* * * * *